(12) United States Patent
Lennartson et al.

(10) Patent No.: US 8,811,928 B2
(45) Date of Patent: Aug. 19, 2014

(54) METHOD AND A DEVICE FOR FINDING IMPERFECTIONS IN AN RF PATH

(75) Inventors: Benny Lennartson, Hagersten (SE); Lars Boncz, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 566 days.

(21) Appl. No.: 12/532,722

(22) PCT Filed: Mar. 26, 2007

(86) PCT No.: PCT/SE2007/050182
§ 371 (c)(1),
(2), (4) Date: Sep. 23, 2009

(87) PCT Pub. No.: WO2008/118049
PCT Pub. Date: Oct. 2, 2008

(65) Prior Publication Data
US 2010/0081427 A1  Apr. 1, 2010

(51) Int. Cl.
*H04B 1/44* (2006.01)
*H04B 7/02* (2006.01)
*H04B 7/08* (2006.01)
*H04B 17/00* (2006.01)
*H04B 7/06* (2006.01)

(52) U.S. Cl.
CPC .......... *H04B 17/0057* (2013.01); *H04B 7/0822* (2013.01); *H04B 17/0067* (2013.01); *H04B 7/0684* (2013.01)
USPC ...................................... 455/303; 455/249.1

(58) Field of Classification Search
CPC ............ H04B 1/44; H04B 7/02; H04W 24/00
See application file for complete search history.

(56) References Cited

U.S. PATENT DOCUMENTS

| 6,560,442 | B1 | 5/2003 | Yost et al. |
| 6,766,146 | B1* | 7/2004 | Park et al. ....................... 455/69 |
| 6,978,151 | B2* | 12/2005 | Choi et al. .................... 455/522 |
| 7,003,290 | B1* | 2/2006 | Salonaho et al. ............. 455/423 |
| 7,286,835 | B1* | 10/2007 | Dietrich et al. ............ 455/456.1 |

(Continued)

FOREIGN PATENT DOCUMENTS

| GB | 2 311 912 A | 10/1997 |
| GB | 2 420 053 A | 5/2006 |

(Continued)

OTHER PUBLICATIONS

International Search Report dated Jan. 14, 2008 (4 pages).

(Continued)

*Primary Examiner* — Marcos Batista
*Assistant Examiner* — Frank Donado
(74) *Attorney, Agent, or Firm* — Myers Bigel Sibley & Sajovec, PA

(57) ABSTRACT

The invention discloses a method (700) for finding differences in path loss between a plurality of RF paths between a first (120, 130) and a second (120, 130) transceiver in a wireless communications system (100). During defined 5 intervals of time (SACCH1-SACCH4), only one RF path is used to transmit from one of said transceivers to the other of said transceivers, and the receiving transceiver measures the strength of the signal received during at least a number of said intervals, thus making it possible to compare signal strength and thereby path loss between different RF paths, which in turn 10 makes it possible to find imperfections in one or more of said RF paths.

19 Claims, 7 Drawing Sheets

(56) References Cited

U.S. PATENT DOCUMENTS

| | | | |
|---|---|---|---|
| 7,844,010 B2* | 11/2010 | Ylitalo et al. | 375/267 |
| 8,023,955 B2* | 9/2011 | Anderson | 455/450 |
| 2004/0106423 A1* | 6/2004 | McGowan et al. | 455/522 |
| 2004/0170132 A1* | 9/2004 | Shin et al. | 370/294 |
| 2005/0090261 A1* | 4/2005 | Agin | 455/442 |
| 2005/0141624 A1 | 6/2005 | Lakshmipathi et al. | |
| 2005/0227631 A1* | 10/2005 | Robinett | 455/83 |
| 2005/0272425 A1* | 12/2005 | Amerga et al. | 455/436 |
| 2006/0199546 A1 | 9/2006 | Durgin | |
| 2007/0025464 A1 | 2/2007 | Perlman | |
| 2007/0178930 A1* | 8/2007 | Xiao et al. | 455/522 |
| 2007/0238414 A1* | 10/2007 | Cleveland et al. | 455/63.1 |
| 2008/0161003 A1* | 7/2008 | Brueck et al. | 455/437 |
| 2008/0166976 A1* | 7/2008 | Rao | 455/69 |
| 2010/0022242 A1* | 1/2010 | Nizri et al. | 455/435.2 |

FOREIGN PATENT DOCUMENTS

| | | |
|---|---|---|
| JP | 6-188803 A | 7/1994 |
| JP | 10-042338 A | 2/1998 |
| JP | 2006-510260 A | 3/2006 |
| WO | WO 99/05878 | 2/1999 |
| WO | WO 2004/054135 A1 | 6/2004 |
| WO | WO 2006/078417 A2 | 7/2006 |

OTHER PUBLICATIONS

Japanese Office Action Corresponding to Japanese Patent Application No. 2010-500866; Mailing Date: Mar. 5, 2012; Foreign Text: 2 pages, English Summary: 1 page.

Japanese Decision to Grant Corresponding to Japanese Patent Application No. 2010-500866; Issued Date: Dec. 21, 2012; 2 Pages (Foreign Text Only).

European Search Report Corresponding to European Application No. 07748353.5-1855; Dated: Jul. 16, 2013; 3 Pages.

European Office Action Corresponding to European Application No. 07748353.5-1855; Date Mailed: Sep. 6, 2013; 6 Pages.

European Office Action Corresponding to European Application No. 07748353.5-1855; Date Mailed: Mar. 4, 2014; 5 Pages.

* cited by examiner

METHOD AND A DEVICE FOR FINDING IMPERFECTIONS IN AN RF PATH

TECHNICAL FIELD

The present invention discloses a method and a device by means of which imperfections can be found in an RF path between two transceivers in a wireless communications system.

BACKGROUND

A major concern for an operator of a wireless communications network such as a mobile telephony network is to ensure that the network provides good coverage. In this context, it has been seen that loss of coverage and other network problems are often related to installation problems in the network.

For example, a feeder degradation of only a few dB in a Base Station can seriously affect both the uplink and the downlink coverage, which is a problem since coverage is directly related to revenue for the operator of the network.

To locate a problem or an imperfection in an installation in a network is very difficult at present. Problems such as, for example, the mentioned feeder degradation of a few dBs, can be almost impossible to find and may thus remain unnoticed by the operator for along time. This situation is sometimes made worse due to the fact that operators tend to reuse sites for different technologies, and sometimes reuse the same equipment.

SUMMARY

Thus, as explained above, there is a need for a method and a device by means of which it would be possible to locate problems which cause unnecessary path losses and/or path attenuation in wires communications networks.

This need is addressed by the present invention in that it provides a method for finding differences in path loss between a plurality of RF paths between a first and a second transceiver in a wireless communications system.

According to the method of the invention, during defined intervals of time only one RF path is used to transmit from one of said transceivers to the other of said transceivers, with the receiving transceiver measuring the strength of the signal received during at least a number of said intervals, which makes it possible to compare signal strength and thereby path loss between different RF paths, which in turn makes it possible to find imperfections in one or more of said RF paths.

Thus, by means of the invention, a method is provided by means of which problems in installations in wireless communications networks can be located in a way which has hitherto been impossible.

The invention also discloses a transceiver for making it possible to find differences in path loss between a plurality of RF paths between the transceiver and another transceiver in a wireless communications system.

BRIEF DESCRIPTION OF THE DRAWINGS

The invention will be described in more detail in the following, with reference to the appended drawings, in which.

DETAILED DESCRIPTION

Figure 1:
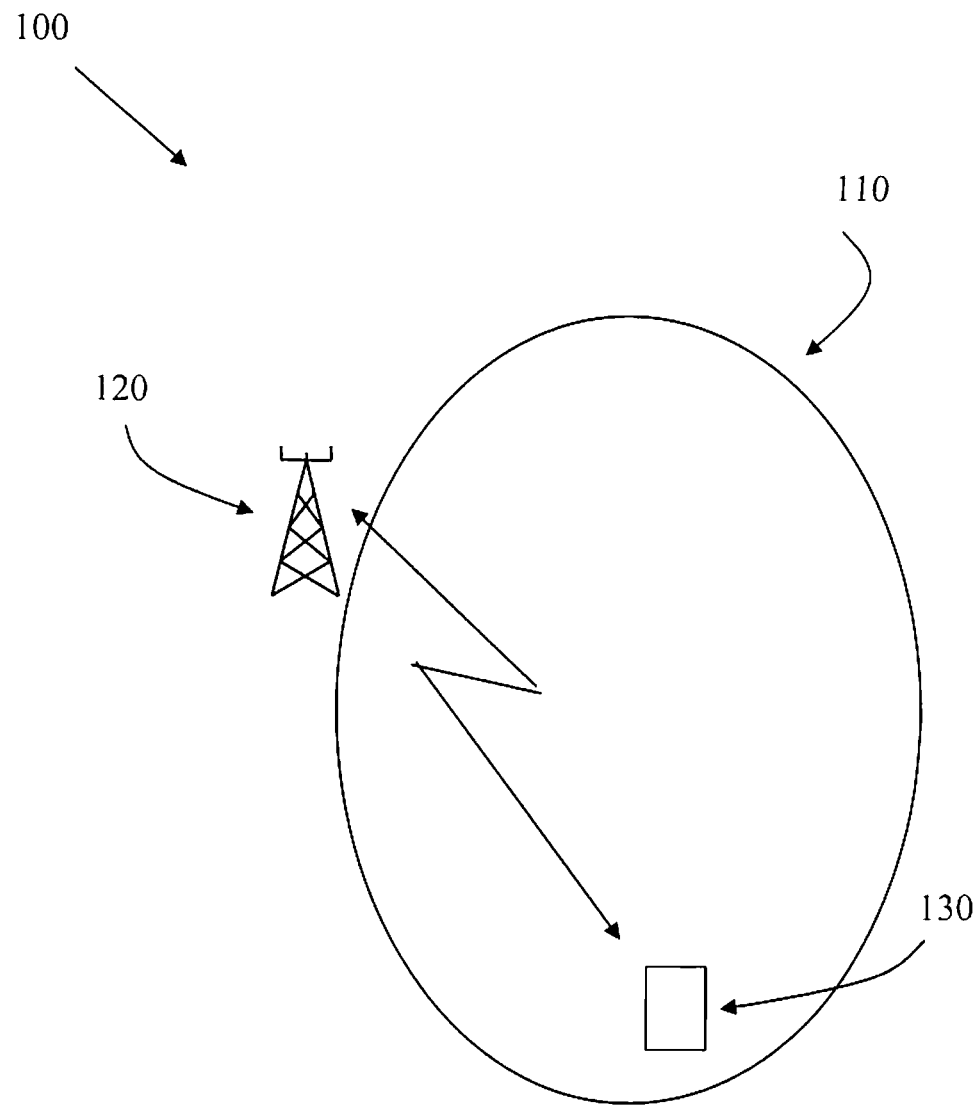
FIG. 1 shows a system in which the invention may be used.

FIG. 1 shows an example of a system 100 in which the invention can be applied. Before the system 100 and the invention are elaborated upon in more detail, it should be pointed out that the invention can be applied to a large number of wireless communications systems, such as more or less any system in which it is possible to transmit between two points on a plurality of different RF paths. One example of such a system is the WLAN standard 802.11n.

Thus, although the invention will be described with reference to a GSM system such as the one shown in FIG. 100, it should be understood that this is by way of example only, in order to facilitate the reader's understanding of the invention. Similarly, a number of terms will be used which are specific to the GSM system, but the components which the terms refer to should be seen as generic components which can be found in many different wireless communication systems.

Returning now to FIG. 1, there is shown a wireless communications system 100, which is a cellular system, such as the GSM system. The system 100 comprises a number of cells 110, in which there can be a number of Mobile Stations, MS 130. The communication to and from an MS 130 in a cell 110 is controlled by a Radio Base Station, RBS 120. Thus, the system can be seen as comprising at least two transceivers, the MS 130 and the RBS 120, which communicate with each other.

Communication from the RBS 120 to the MS 130 is usually referred to as "down link", with communication in the other direction being referred to as "up link".

Figure 2:
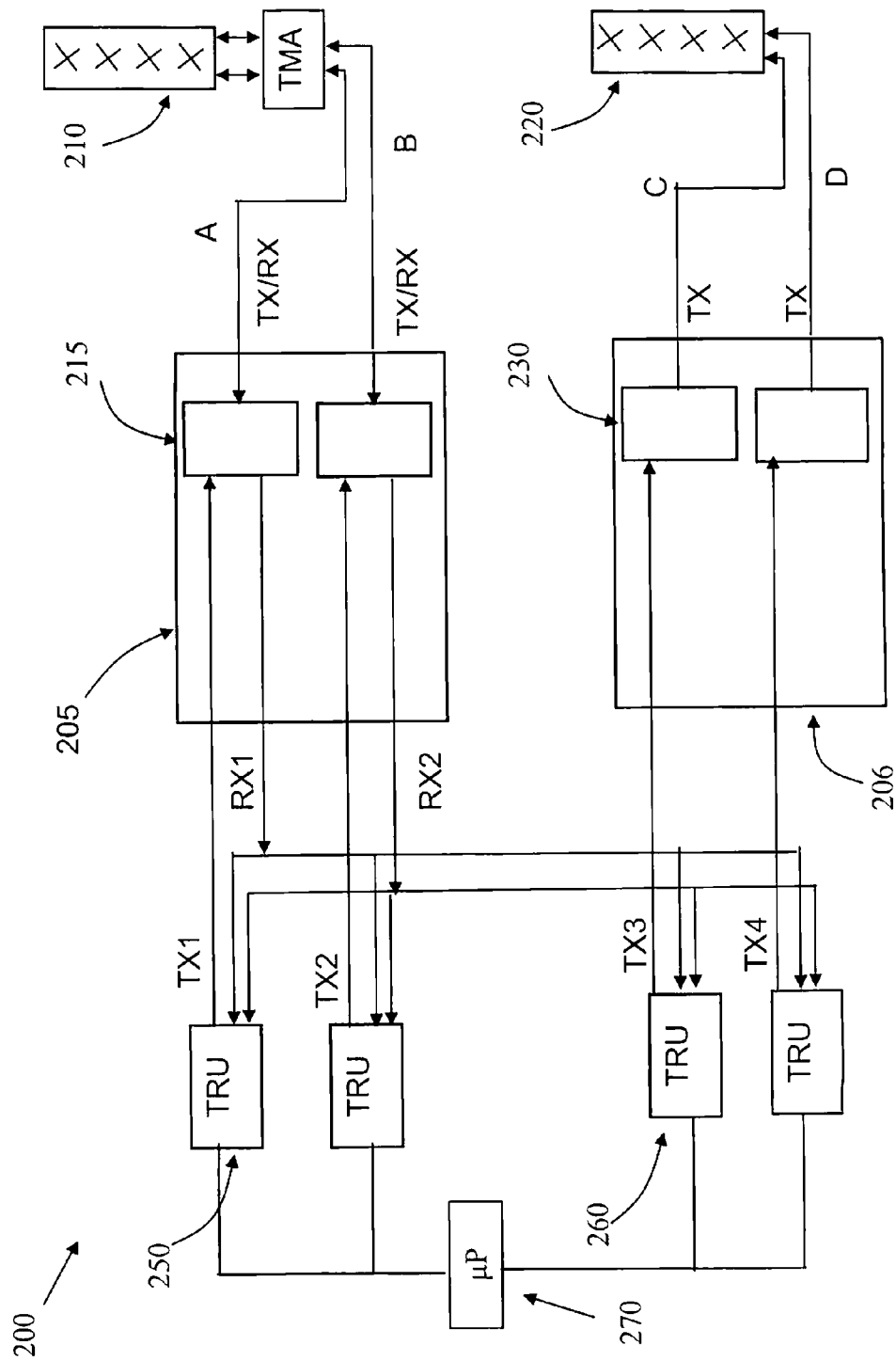
FIG. 2 shows a transceiver in which the invention may be used.

FIG. 2 shows a block diagram of an example of an RBS 200 in which the invention may be applied. Schematically, the RBS 200 comprises four Transceiver Units, TRU, two of which have been labelled 250, 260, each of which is equipped with a transmitter and a receiver. Each of the TRUs is in turn connected to a CDU 205, 206, a Combiner and Distribution Unit.

There are thus four transmit channels in the RBS 200, shown as TXx1-Tx4 in FIG. 2. The transmit signals of the transmit channels Tx1-Tx4 are passed though duplex filters in the CDUs, two of which are shown as 215 and 230 in FIG. 2.

As is also shown in FIG. 2, the RBS 200 comprises two physical antenna units 210, 220, each of which is for transmission by two of the TRUs. As indicated in FIG. 2, each of the two physical antenna units actually comprises two antennas, which are cross-polarized with respect to each other. Thus, although there are two physical antenna units in FIG. 2, there is actually a total of four antennas available, shown as A, B, C, D, two each for the two TRUs 250, 260, antennas A and B for TRU 250 and antennas C and D for TRU 260.

As can also be seen, only one of the physical antenna units 210 is used for reception. With reference to the discussion of "up link" and "down link" previously in this text, it can thus be seen that for the down link, antennas A, B, C and D are available, while for the up link, only A and B are available.

In the following, the term "RF path" will be used. This term is used in this text to denote the signal path from/to the transmitter/receiver in the TRU in the RBS all the way to/from the MS 130. With renewed reference to the RBS 200 of FIG. 2, it will be realized that four alternative down link RF paths are available to the RBS 200, from now on referred to as A, B, C and D, using the references of the corresponding antennas involved.

It will be realized by those skilled in the art that a multitude of imperfections can exist in an RF path, which will cause path losses, i.e. an increase in the total attenuation in the RF path between transmitter and receiver, which will be difficult to locate, or sometimes even to understand that they exist. One object of the present invention is to make it possible to find such imperfections. The present invention can be used in the up link as well as in the down link, but will in the following be described with reference to a downlink example.

Briefly, a principle of the invention utilizes what might be referred to as "RF path hopping" carried out at a pace that aligns with defined measurement periods on the downlink for the MS. This means that during or after each measurement period, the MS will be able to report the signal strength of one specific RF path to the RBS, and by changing the RF path between measurement periods so that only one RF path is used per measurement period, it will be possible to compare the reported signal strength from each RF path and detect any difference between the RF paths.

In the following detailed description, reference will be made to the SACCH (Slow Associated Control Channel) measurement period in the GSM system as the measurement period of the invention. However, it should be pointed out this is merely one example of an embodiment of the invention, it is entirely within the scope of the present invention to use other periods as the measurement periods of the invention.

According to the invention, only one RF path is used per measurement period, in this example the SACCH period (SACCH multi frame) of the GSM system. Consequently, the measurements performed by the MS during an SACCH period will be for one and the same RF path.

Figure 3:
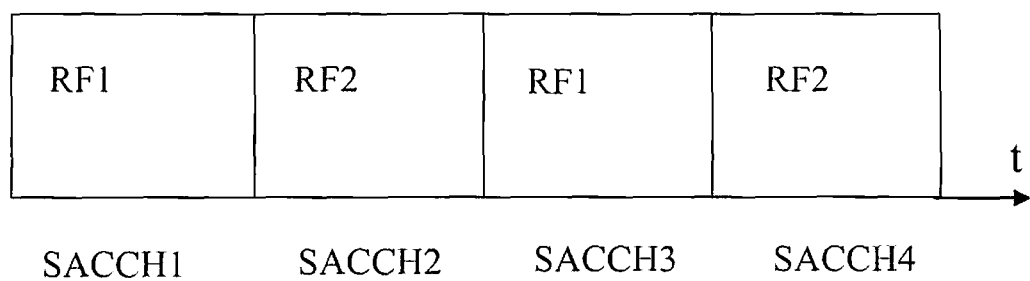
FIG. 3 shows an embodiment of the invention.

One example of how this RF path hopping could be performed is shown in FIG. 3. This shows that there are two RF paths, referred to as RF1 and RF2, which the RBS changes between every SACCH period. This means that every second measurement from the MS will report the signal strength when RF path 1 was used, while the measurements in between will be from periods when RF path 2 was used.

Naturally, the amount of RF paths used and switched between here is merely an example.

According to the invention, the downlink signal strengths from a number of (suitably) consecutive measurement reports from the MS to the RBS are compared. If the RF paths have similar performance, the average difference between the RF path signal strengths will be small or none at all. However, if an RF path is attenuated, then the average difference will not be equal to zero, and it will be possible to see which RF path that has an abnormal attenuation.

The correlation between two consecutive SACCH measurements made by the MS is high, which means that if all differences between a number of (suitably) consecutive measurements were to be compiled and presented in a histogram, the histogram would show a "bell curve" with low standard deviation.

Figure 4:
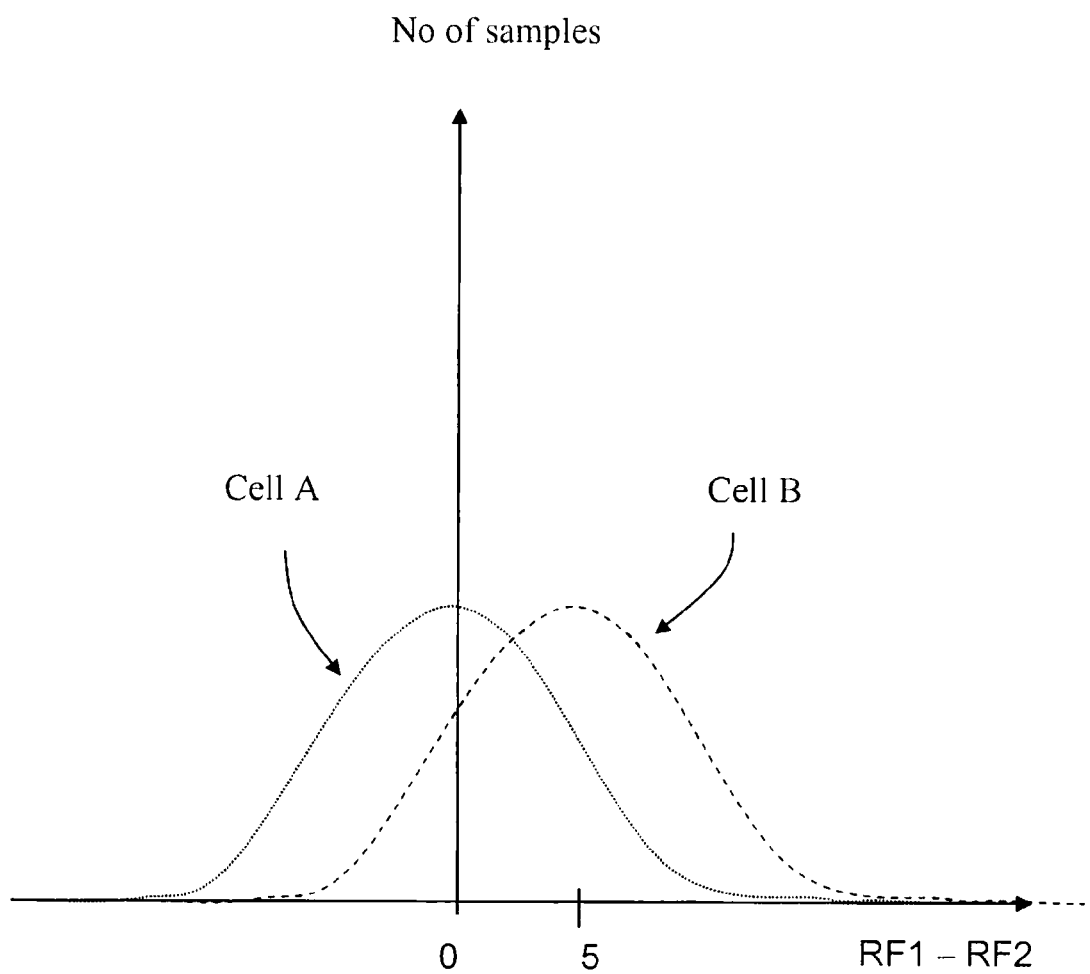
FIG. 4 shows a principle behind the invention.

In order to further illustrate a principle behind the invention, reference will now be made to FIG. 4, which can be seen as a histogram which shows the number of differences/samples between two different RF paths on the y-axis. What is shown in FIG. 4 is the result if the invention is applied to two cells such as the cell 110 in FIG. 1. Both of the cells have two RF paths, referred to as RF1 and RF2 respectively. In one of the cells, referred to as Cell A, both of the RF path are in good condition, but in Cell B one of the RF paths, RF 2, has an attenuation which is abnormal.

Thus, as shown in FIG. 4, the "good cell", cell A, has an average difference of zero dB between RF1 and RF2, while the average difference in signal strength between the RF1 and RF2 in the "poor cell", Cell B, in this example is 5 dB. This indicates that RF Path 1 is seen by the MS as on average 5 dB stronger than RF Path2, and thus indicates to an operator that there is a problem with RF Path 2 in Cell B.

It can be pointed out that power control is believed by the inventors of the present invention to have little impact on the invention. There could be an impact if power control changes the power on the downlink between two consecutive SACCH periods. However, looking at many consecutive SACCH periods and for many samples, it is believed that there will be as many increases as decreases between two consecutive periods.

This means the width of the bell curve mentioned above could increase slightly due to power control, but the average would stay the same. Just after a mobile accesses a new time slot, either due to call set up or handover, it is highly likely that the power control will adjust the power, which can possibly affect the first few measurements. This would only have an impact for networks with short calls or frequent handover. If this distorts the result of the measurements of the invention, a solution could be to omit the first few measurements after call setup or handover from the analysis.

Returning now to the RF path hopping of the invention, this should suitably be carried out in such a manner that it will be possible see the differences between all possible RF path combinations in a cell. This is preferably achieved by making all calls in a cell "hop" over as many RF paths as possible in the cell. Assume, for example, that a cell has 4 different RF paths, referred to as RF1, RF2, RF3 and RF4.

A call in this cell could for example hop in such a manner that RF1 will be used for SACCH period 1, RF2 for SACCH period 2, RF3 for SACCH period 3 and RF4 for SACCH period 4. The RF path hopping sequence would thus be: RF1→RF2→RF3→RF4→RF1→RF2→ . . . etc.

If this RF path hopping sequence is applied on all calls in the cell, then it will be possible to create one graph as seen in FIG. 4. per "RF relation". In other words, there would be one graph for RF1-RF2, another graph for RF2-RF3, etc.

Figure 5:
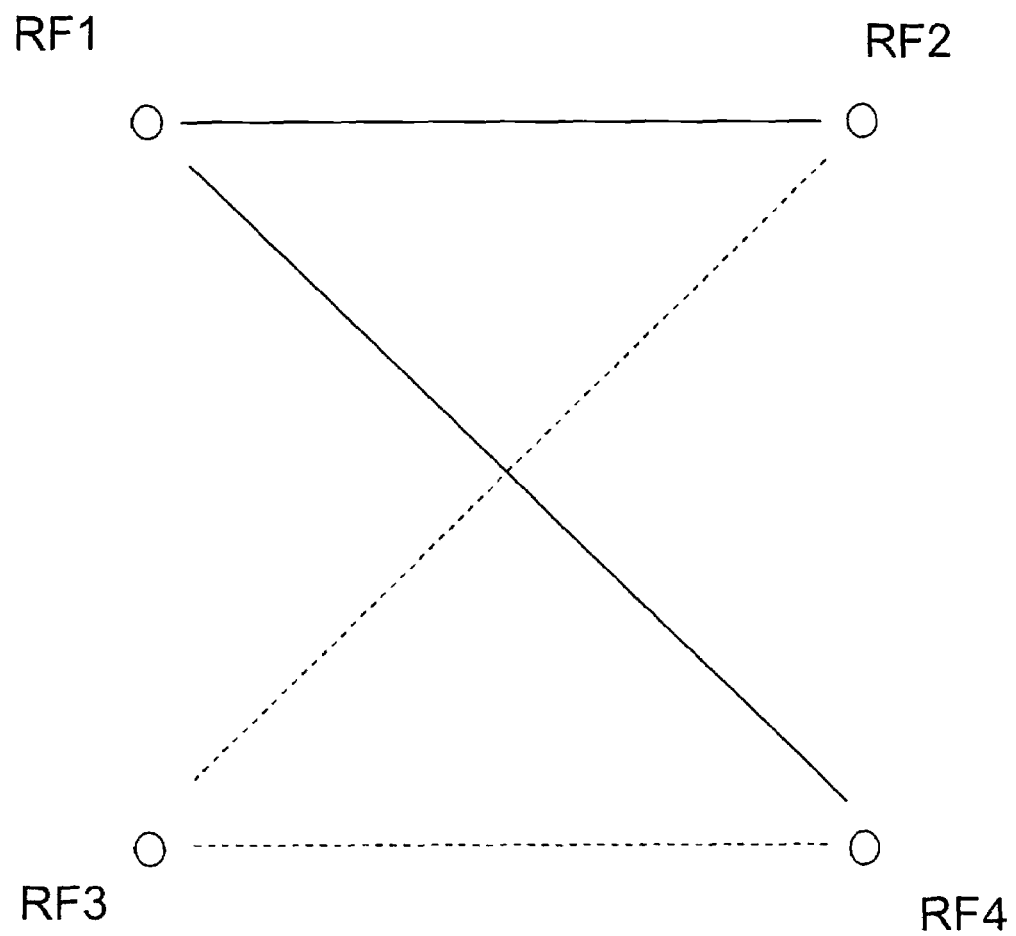
FIGS. 5 and 6 show further embodiments of the invention.

Another way of illustrating the differences in RF paths is shown in FIG. 5. In FIG. 5, each RF path is represented by a circle. The line connecting two dots, i.e. two RF paths, is solid or dashed, depending on the average signal strength difference between the two RF paths which are connected by the line in question. A solid line shows that the average of all signal strength differences collected between these two RF paths is zero or close to zero, which is the case in the relation RF1<->RF2 and RF4<->RF1. However, the average value of signal strength differences collected between RF2<->RF3 and RF3<->RF4 is dashed, due to the fact that RF3 has an attenuation of some 3 db. The illustration used in FIG. 5 can be applied to all cells, no matter how many RF paths that the connections hop over. If more RF paths are used, there will simply be more lines and more dots.

The sequence used to select which RF path to use for a certain SACCH period should cover as many RF paths as possible. For example, in the case with 4 RF paths in a cell, see FIG. 5, all dots should ideally be connected to each other, and the RF path hopping sequence should preferably give the same amount of samples for all combinations of RF path pairs.

The RF path hopping sequence should also prevent two calls which are transmitted at the same time to request the same TX path. The invention discloses two ways of achieving this, referred to as Individual call RF path hopping, and MAIO based TX hopping sequence, which are described in detail below.

Individual Call RF Path Hopping

This principle creates a short basic RF path hopping sequence, with a length which depends on the number of RF paths. The basic sequence is shifted by one every time the basic sequence has been completed, in other words a basic sequence, for example RF1→RF2→RF3→RF4, would result in the following RF path hopping for a call: RF1→RF2→RF3→RF4→RF2→RF3→RF4→RF1→RF3→RF4→RF1→RF2, etcetera.

For each simultaneous call, a fixed "call offset" is added, that is one call has "call offset"=0, the second call has "call offset"=1, the third call has "call offset"=2 and so on. For example, in a cell with 6 RF paths, numbered 1 to 6, the basic RF path hopping sequence could be 1→4→3→5→1. This would result in the following sequences for the six calls that can be transmitted simultaneous in the cell:

Call 1: 1→4→3→5→1→2→5→4→6→2→3→6→5→1→3 etcetera.
Call 2: 2→5→4→6→2→3→6→5→1→3→4→1→6→2→4 etcetera.
Call 3: 3→6→5→1→3→4→1→6→2→4→5→2→1→3→5 etcetera.
Call 4: 4→1→6→2→4→5→2→1→3→5→6→3→2→4→6 etcetera.
Call 5: 5→2→1→3→5→6→3→2→4→6→1→4→3→5→1 etcetera.
Call 6: 6→3→2→4→6→1→4→3→5→1→2→5→4→6→2 etcetera.

MAIO Based TX Path Hopping Sequence

The MAIO based TX hopping sequence ensures that all RF path relations get measurement samples by using Mobile Allocation Index Offset, MAIO, as a base for which RF path hopping sequence to use. That is, all the calls that get allocated on MAIO 0 use one specific RF path hopping sequence, all calls on MAIO 1 use another sequence, etc. An example of two such sequences is shown in FIG. 6 with the aid of solid lines (MAIO 0) and dashed lines (MAIO 1).

Figure 6:
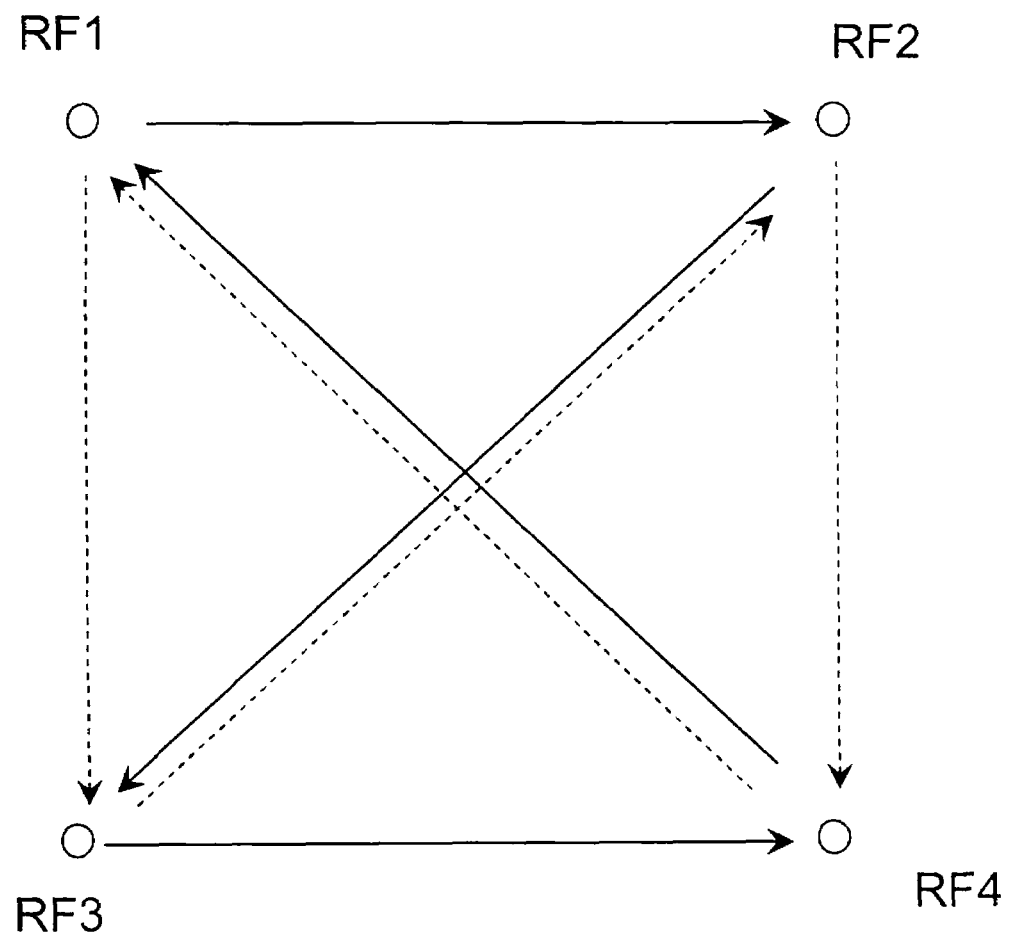

The solid line in FIG. 6 shows the RF path hopping sequence for calls made on MAIO 0, and the dashed lines show the RF path hopping sequence for calls made on MAIO 1. In FIG. 6, RF1 is the "starting point" for MAIO 0, and RF2 is the starting point for calls made on MAIO 1.

Thus, by means of the invention, it is made possible to detect RF path problems on all RF paths in a cell which carry traffic, and eliminates the need to visit installation sites in the network to inspect for problems on RF paths.

In conclusion, according to the invention, in GSM RF path hopping is performed at intervals which are suitably the same as the SACCH Measurement period (480 ms).

The RF path hopping period is preferably aligned with the SACCH Measurement period, so that the MS reports the signal strength on one RF path.

By changing RF path every SACCH period, it is believed that slow changes of signal strength, such as if a person turns his head during a call, is eliminated.

The downlink signal strength in the measurement reports are, in this example, subtracted between 2 consecutive SACCH periods in order to compare the difference between 2 RF paths.

The invention can be applied on several RF paths. However the number of RF paths in the hopping sequence will be larger, which will make the implementation of the invention more sophisticated.

It should also be pointed out that it is only necessary for one RF path to be used per measurement period, i.e. the RF path doesn't need to be used during the entire measurement period, so long as no other RF paths are used during that measurement period. Similarly, the MS doesn't need to measure signal strength during the entire measurement period, it may be sufficient for the MS to only measure signal strength during part of the measurement period.

Turning now to the mechanism for coordinating which RF path to use and when, and to carry out the RF path hopping, as well as the collecting of measurement reports and compiling "difference reports" between the various RF path combinations, these tasks are suitably carried out by a processing unit in the RBS 200, shown as a microprocessor 270 in FIG. 2. As an alternative, the RBS can transmit the measurement reports to another node in the system for processing there, so that the "difference reports" will be compiled outside of the RBS. Similarly, the RF path hopping can be initiated locally, i.e. by an intelligent function in the RBS, or the RBS can be ordered to carry out RF path hopping by another node in the system. If the invention is applied to a GSM system, the node which the RBS reports to and which compiles the measurement reports will usually be the BSC, Base Station Controller, although other nodes in the system may also be used for this.

Figure 7:
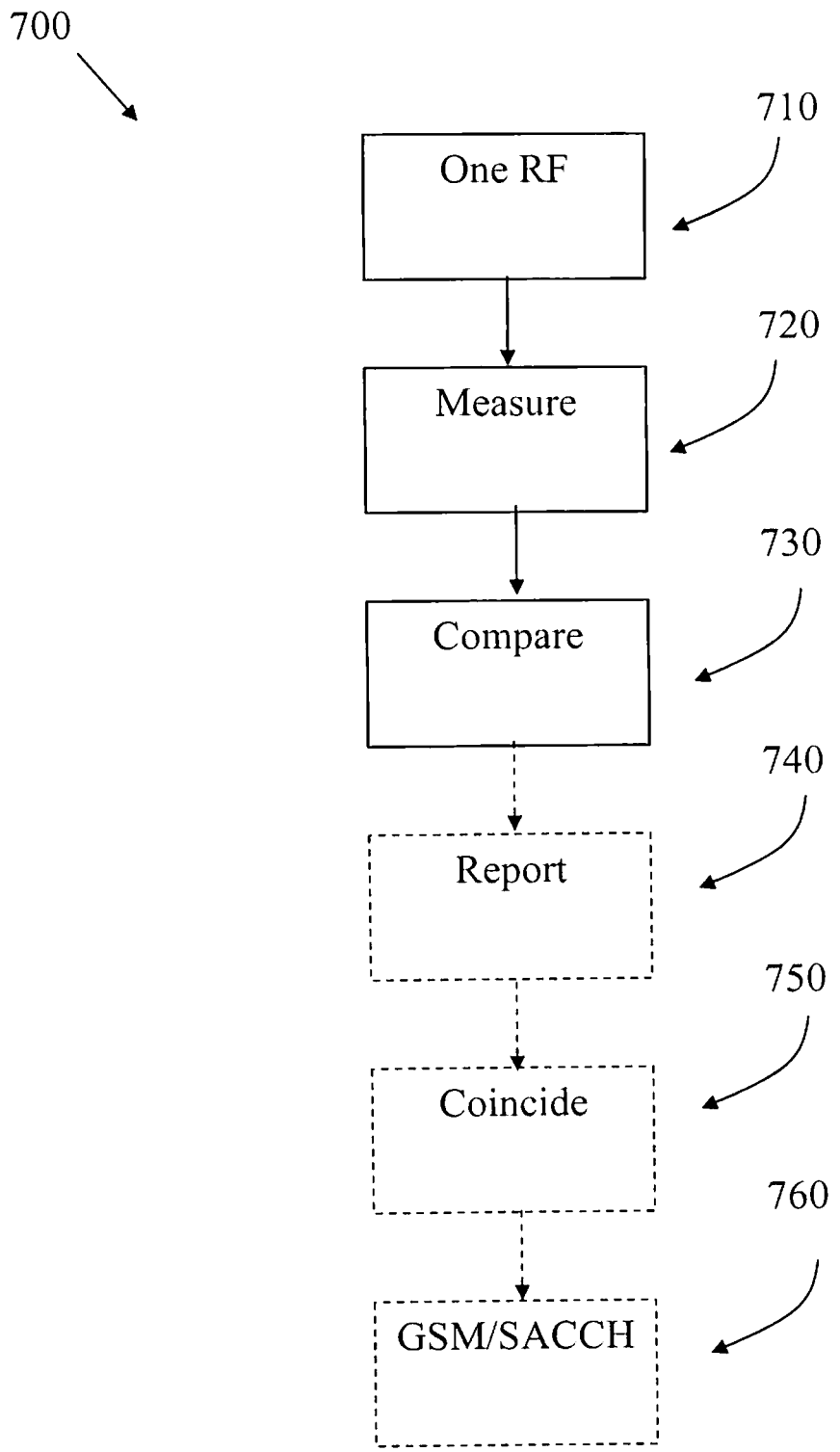
FIG. 7 shows a flow chart of a method of the invention.

FIG. 7 shows a schematic flow chart 700 of a method of the invention. Steps which are options or alternatives are shown with dashed lines.

As indicated in step 710, only one RF path is used at a time during defined intervals of time to transmit from one of the transceivers to the other of the transceivers, and, as indicated in step 720, the receiving transceiver measures the strength of the signal received during at least a number of said intervals. Step 730 shows that this enables a comparison of signal strength between different RF paths, which in turn makes it possible to find imperfections in one or more of said RF paths.

Step 740 shows that in one embodiment of the invention, the receiving transceiver sends reports on the measurements to the first transceiver. As shown in step 750, the intervals in which only one RF path is used at least in part coincide with the measurement periods of the second transceiver As shown in step 760, the invention may be applied to the GSM system, and in that case the measurement periods are suitably the SACCH periods.

The invention is not limited to the examples of embodiment described above and shown in the appended figures, but may be freely varied within the scope of the appended claims. For example, as mentioned previously in this text, the invention may be applied to the up link as well as to the down link. The main difference if the idea is applied to the up link is that it will be the RBS that measures signal strength on transmission from the MS. In other words, the RBS as "the receiving transceiver" will not send reports to the transmitting transceiver, the MS, but will collect and compare them itself, as an alternative to which it will send the measurement reports to another node in the system for processing, as mentioned previously in this text. The RBS will then switch between different receivers, RX1 and RX2, instead of switching between different transmitters, as is the case in the down link application of the invention.

It should be pointed out that the number of TX and RX channels can be varied within the scope of the invention and is not restricted to the amounts shown in the drawings and described above.

Also, it should be mentioned that the invention can also be applied in system in which the MS has more than one transmitter. In such cases, the MS may switch between its different transmitters in the fashion described above for the down link, with the RBS measuring the signal strength in the different measurement intervals. An intelligent mechanism either in the RBS or another node in the system orders the MS to switch between the different transmitters, and also the fashion or order in which it should switch between them.

With reference to the measurement periods or intervals shown and described above, it can be pointed out that preferably these two intervals are from one and the same session ("phone call") between said two transceivers. In one particular embodiment, the two intervals are two consecutive intervals. It should also be mentioned that the way of switching between RF paths which has been described above can be varied within the scope of the invention: as an alternative to switching between RF paths by switching between TRUs, it is instead possible to have a switch connected to each TRU, the switch connecting the TRU to one RF path at a time. In such an embodiment, the RBS 200 of FIG. 2 could in principle comprise only one TRU, with TX1-TX4 and RX1 and RX2 being connected to that TRU. The switch would then connect one TX and/or RX at a time to the TRU.

In such an application, it would not be possible to include losses in the TRU in the measurements of differences between different RF paths, which is made possible in the embodiment where the TRU is included in what it is that is alternated between the measurement intervals.

The invention claimed is:

1. A method for finding differences in path loss between a plurality of radio frequency (RF) paths between a first transceiver and a second transceiver in a wireless communications system, the method comprising:
    using different ones of the RF paths during respective different defined intervals of time to receive signals at one of the first and second transceivers from the other one of the first and second transceivers,
    measuring first and second signal strengths of the signals received using respective first and second ones of the RF paths during first and second ones of said respective different intervals,
    comparing the first and second signal strengths of the first and second RF paths using measurements from the first and second intervals,
    wherein one of the first and second transceivers comprises a base station comprising different physical transmission antennas,
    wherein a different one of the first and second transceivers comprises a mobile device,
    and
    wherein the different ones of the RF paths are defined by transmission from the different physical transmission antennas of the base station and/or by different transmission polarizations, and by reception at the mobile device; and
    communicating between the first and second transceivers using a third RF path, and
    not the first RF path and not the second RF path, between the first and second transceivers,
    during a third interval that follows the first and second intervals,
    the method further comprising:
        determining an average difference between a third signal strength of the third RF path and the first signal strength;
        determining an average difference between the third signal strength and the second signal strength; and
        identifying greater attenuation provided by one of the different ones of the RF paths responsive to determining an average difference between the signal strengths of the different ones of the RF paths, respectively.

2. The method of claim 1,
where said first transceiver is the transmitting transceiver during said intervals,
where the second transceiver is the receiving transceiver during said intervals, and
where the method further comprises:
    sending, via the second transceiver, reports on said measurements to the first transceiver.

3. The method of claim 2,
where the first transceiver and the second transceiver communicate with each other in specified data frames which have a certain extension in time,
where the second transceiver carries out the measurements of the received signal strength during at least a specified period of one of said data frames, and
where said intervals in which only one RF path is used at least in part coincide with the measurement periods of the second transceiver.

4. The method of claim 3, where the intervals that an RF path is used is a same as said period during which the second transceiver makes its measurements.

5. The method of claim 1,
where said second transceiver is the transmitting transceiver during said intervals, and
where the first transceiver is the receiving transceiver during said intervals.

6. The method of claim 5,
where the first transceiver and the second transceiver communicate with each other in specified data frames which have a certain extension in time,
where the first transceiver carries out measurements of the received signal strength during at least a specified period of one of said data frames, and
where said intervals in which only one RF path is used at least in part coincide with the measurement periods of the first transceiver.

7. The method of claim 6, where the intervals that an RF path is used is a same as said period during which the first transceiver makes its measurements.

8. The method of claim 1, where the comparing includes:
    comparing the signal strengths from two different ones of said intervals, said two different ones of said intervals being from a same session between said first and second transceivers, where said two different ones of said intervals are two consecutive intervals.

9. The method of claim 1, further comprising:
    sending reports on the measurements to a third node in the wireless communications system, the reports allowing for the signal strengths to be compared and conclusions to be drawn regarding path losses between the different RF paths.

10. The method of claim 1, further comprising:
    compiling, via the first transceiver, reports on said measurements, the reports allowing conclusions to be drawn regarding path losses between the different RF paths.

11. A transceiver for use in a wireless communications system, the transceiver comprising:
   at least a first transmitter and a second transmitter, and
   at least a first receiver and a second receiver, the at least the first transmitter and the second transmitter and the at least the first receiver and the second receiver being configured to provide communication with another transceiver in said wireless communications system, so that at least a first radio frequency (RF) path and a second RF path are available, in both the transmit and receive direction for said transceiver, for communication with said other transceiver in the wireless communications system,
   where the transceiver further comprises:
      a switch configured to switch between the first and second RF paths so that, during defined intervals of time, only one RF path, of the first and second RF paths, is used for transmission or reception in the communication with said other transceiver in the wireless communications system, wherein switching between the first and second RF paths comprises switching between either the first and second transmitters or between the first and second receivers,
   wherein each defined interval comprises a measurement period,
   wherein the switch is configured to switch between the first and second RF paths such that each measurement period corresponds to a change between the first and second RF paths, and
   wherein the first and second RF paths correspond to first and second signal strengths, respectively; and
   a processor configured to:
      control communication with said other transceiver using a third RF path, and not the first RF path and not the second RF path, between the transceiver and said other transceiver, during a third measurement period that follows first and second measurement periods in which the first and second RF paths are used;
      determine an average difference between a third signal strength of the third RF path and the first signal strength;
      determine an average difference between the third signal strength and the second signal strength; and
      identify greater attenuation provided by one of the first and second RF paths responsive to determining an average difference between the first and second signal strengths of the first and second RF paths.

12. The transceiver of claim 11,
   where the switch enables the transceiver to only transmit on one RF path at a time during said intervals in time,
   where the transceiver further comprises:
      a receiver configured to receive measurement reports from said other transceiver on the signal strengths for the RF paths used for transmission during said intervals.

13. The transceiver of claim 11,
   where the switch enables the transceiver to only receive on one RF path at a time during said intervals in time,
   where the processor is configured to compile measurement reports on the signal strengths of the RF paths used for transmission.

14. The transceiver of claim 12, wherein the processor is configured to evaluate said reports to identify differences in RF path loss.

15. The transceiver of claim 12, further comprising:
   a transmitter configured to transmit said reports to a third node in the wireless communications system.

16. A method for finding differences between first and second radio frequency (RF) paths that are between a first transceiver and a second transceiver in a wireless communications system, the method comprising:
   communicating between the first and second transceivers using the first RF path and not the second RF path during a first measurement period;
   communicating between the first and second transceivers using the second RF path and not the first RF path during a second measurement period;
   measuring first and second characteristics of the first and second RF paths, respectively, during the first and second measurement periods, respectively;
   comparing the first and second characteristics of the respective first and second RF paths;
   wherein one of the first and second transceivers comprises a base station comprising different physical transmission antennas,
   wherein a different one of the first and second transceivers comprises a mobile device, and
   wherein the different ones of the RF paths are defined by transmission from the different physical transmission antennas of the base station and/or by different transmission polarizations, and by reception at the mobile device; and
   communicating between the first and second transceivers using a third RF path, and not the first RF path and not the second RF path, between the first and second transceivers, during a third measurement period that follows the first and second measurement periods,
   wherein the first and second characteristics comprise first and second signal strengths, respectively,
   the method further comprising:
      determining an average difference between a third signal strength of the third RF path and the first signal strength;
      determining an average difference between the third signal strength and the second signal strength; and
   identifying greater attenuation provided by one of the first and second RF paths responsive to determining an average difference between the first and second characteristics of the respective first and second RF paths.

17. The method of claim 16, wherein comparing the first and second characteristics comprises identifying a difference in path loss between the first and second RF paths, the method further comprising reporting the difference in path loss from one of the first and second transceivers to the other one of the first and second transceivers.

18. The method of claim 1, wherein the different ones of the RF paths are defined by different transmission polarizations and by reception at the mobile device.

19. The transceiver of claim 11,
   wherein one of said transceiver and said other transceiver comprises a base station, and wherein both of the first and second RF paths correspond to the base station, and
   wherein the average difference comprises a non-zero average value of a plurality of measured differences between the signal strengths of the first and second RF paths corresponding to a plurality of changes between the first and RF paths.

* * * * *

UNITED STATES PATENT AND TRADEMARK OFFICE
CERTIFICATE OF CORRECTION

PATENT NO. : 8,811,928 B2
APPLICATION NO. : 12/532722
DATED : August 19, 2014
INVENTOR(S) : Lennartson et al.

Page 1 of 1

It is certified that error appears in the above-identified patent and that said Letters Patent is hereby corrected as shown below:

In the specification

In Column 1, Line 27, delete "along" and insert -- a long --, therefor.

In Column 1, Lines 63-64, delete "used, and" and insert -- used, --, therefor.

In Column 1, Line 66, delete "used, and" and insert -- used, --, therefor.

In Column 1, Line 67, delete "invention, and" and insert -- invention, --, therefor.

In Column 2, Line 1, delete "invention, and" and insert -- invention, --, therefor.

In the claims

In Column 10, Line 63, in Claim 19, delete "and RF paths." and insert -- and second RF paths. --, therefor.

Signed and Sealed this
Sixth Day of October, 2015

Michelle K. Lee
*Director of the United States Patent and Trademark Office*